United States Patent [19]

DeMyer

[11] Patent Number: 4,787,629

[45] Date of Patent: Nov. 29, 1988

[54] EXERCISE LIFTING BAR WITH SELF-CONTAINED WEIGHT MOUNTS

[76] Inventor: David W. DeMyer, 4008 Cooper Rd., Indianapolis, Ind. 46208

[21] Appl. No.: 135,601

[22] Filed: Dec. 21, 1987

[51] Int. Cl.⁴ .............................................. A63B 13/00
[52] U.S. Cl. ..................................... 272/123; 403/261
[58] Field of Search ....................... 272/117, 122, 123; 403/256, 258, 259, 260, 261

[56] References Cited

U.S. PATENT DOCUMENTS

| | | | |
|---|---|---|---|
| 3,146,010 | 8/1964 | Dellith | 403/261 X |
| 3,606,406 | 9/1971 | Walters | 403/261 X |
| 4,369,968 | 1/1983 | Price | 272/123 |
| 4,529,197 | 7/1985 | Gogarty | 272/122 |
| 4,579,337 | 4/1986 | Uyeda | 272/123 |
| 4,638,994 | 1/1987 | Gogarty | 272/122 |
| 4,738,446 | 4/1988 | Miles | 272/123 |

FOREIGN PATENT DOCUMENTS

| | | | |
|---|---|---|---|
| 629735 | 11/1927 | France | 272/123 |
| 1015338 | 9/1952 | France | 272/122 |
| 12843 | of 1912 | United Kingdom | 272/123 |

Primary Examiner—Richard J. Apley
Assistant Examiner—Robert W. Bahr
Attorney, Agent, or Firm—Woodard, Emhardt, Naughton Moriarty & McNett

[57] ABSTRACT

An exercise lifting bar. A set of plates are pivotally mounted to each end of the bar. Each plate within a set is independently and pivotally movable relative to the bar. The plates are positioned between an outer collar threaded to the end of the bar and a spring housing rotatably mounted to the bar. The plates are movable to an aligned position allowing weights to be slipped thereover to facilitate removal or addition of weights to the bar. Plates located outward of the weights are then pivoted against the weights securing the weights between the outer plates and the spring housing. The collars are threaded inwardly tightly securing the weights between the outer plates and the spring housing.

10 Claims, 2 Drawing Sheets

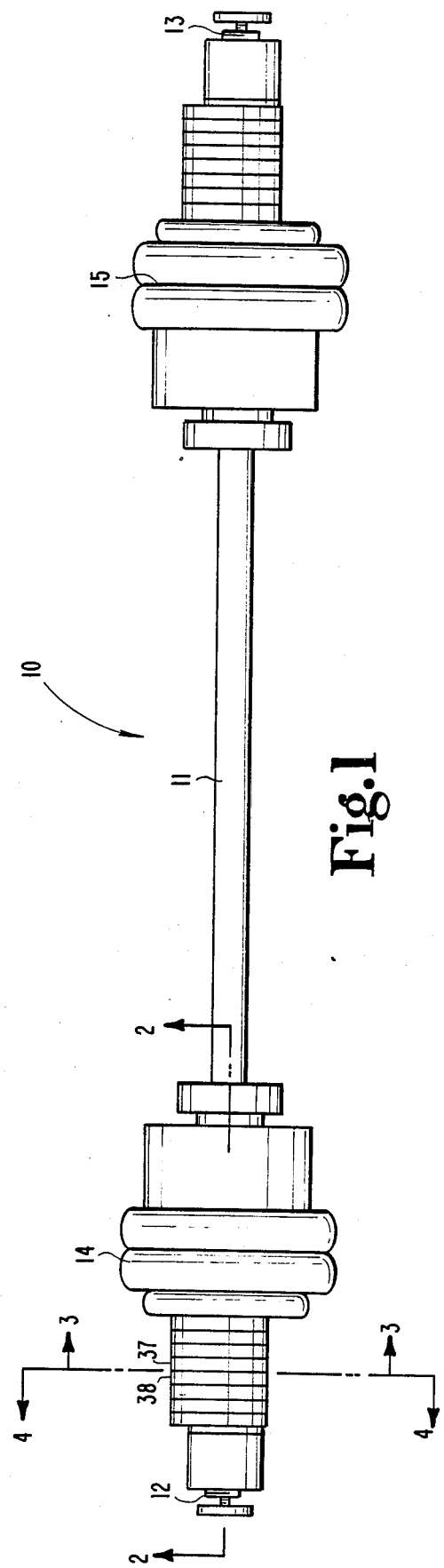
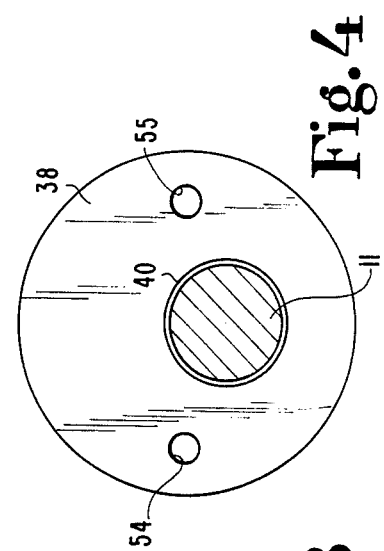
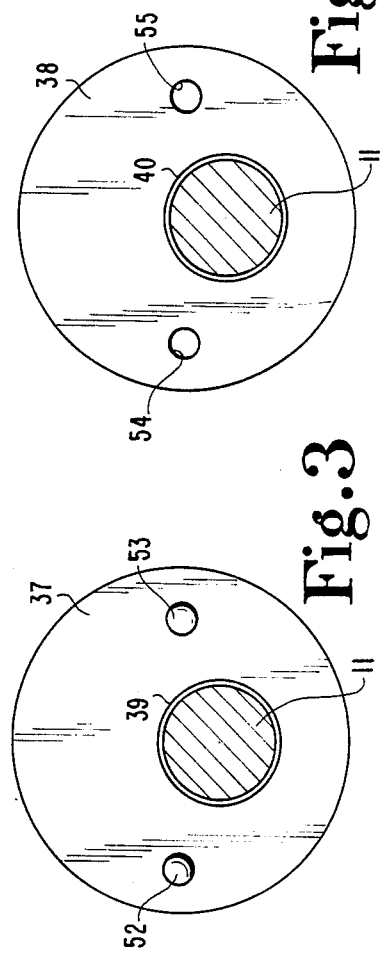

4,787,629

EXERCISE LIFTING BAR WITH SELF-CONTAINED WEIGHT MOUNTS

BACKGROUND OF THE INVENTION

This invention is in the field of exercise devices, and more specifically free weight lifting bars known as "olympic bars". The prior olympic sets include a lifting bar having opposite ends to which a plurality of weights are removably mounted. Weights may be added or subtracted from the bar depending upon the total desired weight to be lifted. It is the practice to use removable collars for mounting to the opposite ends of the bar to secure the weights to the bar. Frequently, the collars are misplaced or are located remotely from the bar. Further, the collars typically include some type of fastening device such as a screw which must be threaded by the user against the bar to prevent relative motion between the collar and the bar. The collars must be axially positioned along the length of the bar depending upon the number of weights to be mounted to the opposite ends of the bar. Disclosed herein is a lifting bar having means permanently mounted to the opposite ends of the bar for removably holding the weights thereon which may be adjusted axially along the length of the bar depending upon the number of weights positioned on the bar. The aforementioned problem of misplaced mounting collars or the need to utilize a tool for securing the collar to the bar has therefore been eliminated.

It is also the practice to provide a lifting bar which may be curlingly lifted upward while allowing the weights mounted thereon to not pivot or rotate with the lifting bar in order to minimize or eliminate any momentum caused by a pivoting or rotating weight. It has therefore been the practice to rotationally mount the weights to the lifting bar. Such a requirement has been taken into consideration with the design of the mounting means disclosed herein for removably securing the weights to the bar.

SUMMARY OF THE INVENTION

One embodiment of the present invention is an exercise lifting bar comprising a bar with a first end and a second opposite end to removably receive weights thereon and having a longitudinal axis, first stop means on the bar and located inward of the first end limiting inward movement of weight when mounted on the first end, second stop means on the bar located inward of the second opposite end and limting inward movement of weight when mounted on the second opposite end, a plurality of first members individually and independently movably mounted on the bar on the first end, the members are each selectively movable from a first position blocking outward movement of weight on the first end to a second position allowing weight on the first end to move outwardly thereon, and, a plurality of second members individually and independently movably mounted on the bar on the second opposite end, the second members are each selectively movable from a third position blocking outward movement of weight on the second opposite end to a fourth position allowing weight on the second opposite end to move outwardly thereon.

It is an object of the present invention to provide a lifting bar having self-contained mounting means for removably securing weights to the bar.

A further object of the present invention is to provide a new and improved olympic lifting bar.

In addition, it is an object of the present invention to provide a free weight lifting bar having means permanently mounted thereon for removably securing the weights to the bar.

Related objects and advantages of the present invention will be apparent from the following description.

BRIEF DESCRIPTION OF THE DRAWINGS

FIG. 1 is a side view of a ligting bar incorporating the present invention having weights mounted to the opposite ends thereof.

FIG. 3 is an enlarged cross-sectional view taken along a line and looking in the direction of arrows 3—3 of FIG. 1.

FIG. 4 is an enlarged cross-sectional view taken along a line and looking in the direction of arrows 4—4 of FIG. 1.

DESCRIPTION OF THE PREFERRED EMBODIMENT

Figure 2:
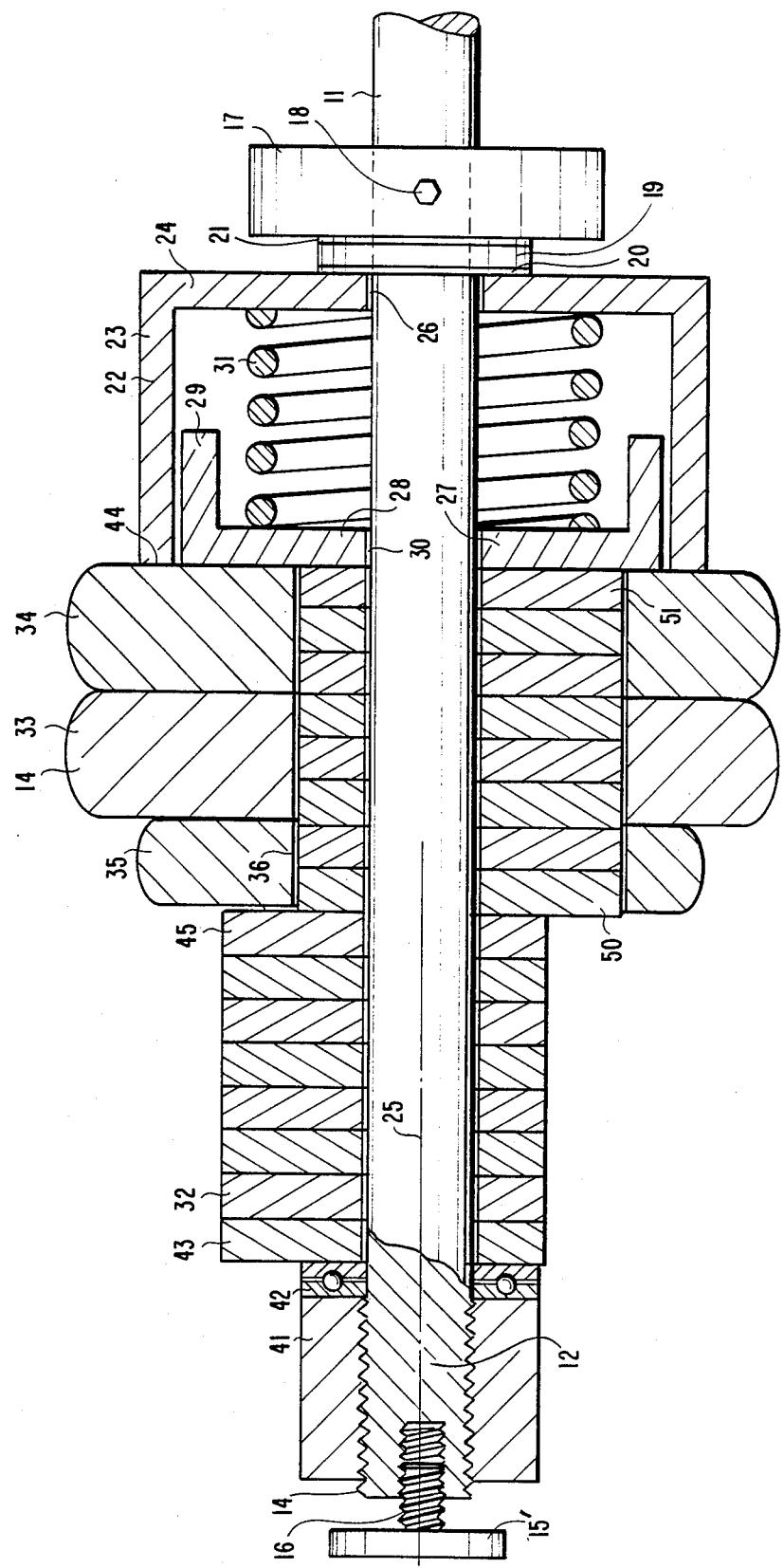
FIG. 2 is an enlarged, fragmentary cross-sectional view taken along a line and looking in the direction of arrows 2—2 of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a free weight exercise lifting device 10 including a lifting bar 11 with opposite ends 12 and 13 having a plurality of weights 14 and 15, respectively, removably mounted thereon.

The left end portion of device 10 is shown in FIG. 2 and will now be described, it being understood that a similar description applies to the right hand portion of the device viewed in FIG. 1. Bar 11 is solid and has an end portion 12 with a plurality of external threads 14 formed thereon. Bar 11 is of constant diameter throughout its length and has an outer plate or washer 15' permanently and fixedly mounted thereto by means of a threaded stud 16 which is threadedly received into rod 11 and affixed to plate 15. The outside diameter of plate 15' is larger than the outside diameter of rod 11. A cylindrical collar 17 is fixedly mounted to bar 11 by means of a conventional device such as a threaded fastener 18. Therefore, relative motion between bar 11 and collar 17 is prevented. A conventional bearing 19 is mounted to bar 11 between a pair of spaced apart washers 20 and 21 also mounted to the bar.

An outwardly opening cup 22 includes an axially extending wall 23 integrally joined to a base wall 24 perpendicularly arranged relative to the longitudinal axis 25 of bar 11. Aperture 26 is centrally located on wall 24 with bar 11 extending therethrough. A cover 27 includes a base wall 28 parallel to wall 24 and an axially extending wall 29 integrally joined thereto. Wall 29 is cylindrical and fits within cylindrical wall 23. An aperture 30 is centrally located on wall 28 with the bar extending through aperture 30. Helical spring 31 is positioned and contained within cup 22 and cover 27.

A plurality of disk-shaped plates 32 are mounted to bar 11. The plates have identical disk-shaped configurations and are mounted off center on bar 11 to allow each plate to be selectively positioned relative to the bar 11 and weights 14 removably mounted thereon. In the embodiment shown in FIG. 2, sixteen such plates 32 are shown mounted to the bar, although it is understood that the present invention contemplates and includes a lifting bar having a greater or smaller number than sixteen such plates.

Weights 14 are conventional in design and typically have an outside diameter determined as a function of the amount of the individual weight. Thus, as shown in FIG. 2, the two inwardly located weights 33 and 34 have the same outside diameter and are of equal weight, whereas the outwardly located weight 35 has a smaller outside diameter and is lighter than weights 33 and 34. In either case, weights 33 through 35 have equal inside diameters formed by an aperture 36 extending centrally through each weight. Weights 33 through 35 each have a center positioned along axis 25 of bar 11. All of the plates 32 have an outside diameter slightly less than apertures 36 to allow the weights to be moved on and off the bar when the plates are aligned to facilitate such movement. Each plate 32 has an aperture extending therethrough which is positioned off center relative the outside diameter of the plate. For example, plate 37 (FIG. 1) includes an aperture 39 (FIG. 3) located off center relative to the exact center of the disk-shaped main body of plate 37. Likewise, plate 38 which is adjacent plate 37 includes an aperture 40 (FIG. 4) located off center relative to the center of the disk-shaped main body of plate 38. All of the apertures of the plates are identical in size and thus apertures 39 and 40 have identical inside diameters which are slightly greater than the outside diameter of bar 11 allowing each individual plate to freely move about the longitudinal axis of the bar. In such a manner, the bar may be curlingly lifted or dropped while the individual plates and weights mounted thereon remain rotationally or pivotally stationary. Thus, relative rotational or pivotal motion occurs between the bar and the plates with weights mounted thereon minimizing or eliminating any momentum from the weights as the bar is rotated. The aperture of each plate is located in the same position relative to the center of each plate. For example, apertures 39 and 40 are located in the same exact position with respect to the true center of plates 37 and 38.

An outer collar 41 (FIG. 2) has a central aperture with internal threads in meshing enagement with threads 14 allowing the collar to be threadedly moved along axis 25. A conventional bearing 42 is positioned between collar 41 and the most outward located plate 43.

In use, collar 41 and its corresponding collar located at the opposite end of the bar are threaded inwardly until the most inwardly located weight 34 and its corresponding weight at the opposite end of the bar are in contact with cup 22 and the cup located at the opposite end of the bar, respectively. More specifically, the distal cylindrical end 44 contacts weight 34. Likewise, the most inwardly located plate 45 having an outside diameter not aligned with aperture 36 is forced against the outwardly facing surface of the most outwardly located weight 35. As such, weights 33 through 35 are tightly held between cup 22 and plate 45 with all of the weights, plates and cup freely rotatable on bar 11 between bearings 42 and 19.

In order to remove or add weights to the bar, collar 41 and its corresponding collar at the opposite end of the bar are threadedly rotated outward thereby allowing spring 31 and the corresponding spring at the opposite end to force cover 27 and its corresponding cover outward disengaging the most inward positioned weight relative to the distal end 44 of cup 23. Further outward movement of collar 41 and its corresponding collar at the opposite end of the bar relieves the pressure between the most outward weights and the plates positioned thereagainst. For example, plate 45 is moved apart from weight 35. The first group of plates defined between plates 43 and 45 may then be pivoted around bar 11 until aligned with a second group of plates defined between plates 50 and 51, or until the first group of plates between plates 43 and 45 are aligned with aperture 36. Thus, the weights may be moved over the plates facilitating the complete removal of or addition of weights onto the end of the bar. Depending upon the total thickness of the weights located at the end of the bar, the plate 45 closest to the outer weight is pivoted along with the remaining outwardly located plates until they are again misaligned with aperture 36 and the plates located within weights 33-35. The outer collars are then tightened and screwed inwardly on the bar tightly holding the weights together. The plates secured by studs to the outer ends of the bar prevent the collars from disengaging the bar. For example, plate 15' has an outside diameter greater than the inside diameter of collar 41 thereby preventing complete disengagement of collar 41 relative to bar 11.

The adjacent contacting surfaces of the plates are provided with a detent and socket arrangement to facilitate the aligning of the plates. For example, plate 37 includes a pair of outwardly protruding balls 52 and 53 which are sized to fit into corresponding holes 54 and 55 of plate 38 Thus, as the plates are pivoted, the user will hear balls 52 and 53 click into holes 54 and 55 signaling that the two plates are perfectly aligned.

The design of plates 32 allow each plate to be selectively movable from a first blocking position limiting outward movement of the weight to a second position allowing the weight to move outwardly past the blocking plate. The plates are pivotally movable on the bar and freely move around the axis of the bar allowing the weights to rotate about the axis as the bar is curlingly lifted. The plates are selectively movable to the blocking position with the most inward of the blocking plates defining a distance to the distal end 44 of the cup between which the weights are positioned. Distal end 44 provides an inward stop whereas plate 45 provides an outward stop. Collar 41 along with cup 22 and spring 31 provide an adjustment means operable to releasably hold the plates tightly together. The balls 52 and 53 and sockets 54 and 55 provide a releasable locking means on the plates to releasably lock adjacent plates together. Most importantly, the design of the plates allow the weights to be moved onto and off of the bar while the plates remain permanently on the bar.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An exercise lifting bar comprising:
   a bar with a first end and a second opposite end to removably receive weights thereon and having a longitudinal axis;
   first stop means on said bar and located inward of said first end limiting inward movement of weight when mounted on said first end;
   second stop means on said bar located inward of said second opposite end and limiting inward movement of weight when mounted on said second opposite end;
   a plurality of first members individually and independently movably mounted on said bar on said first end, said members are each selectively movable from a first position blocking outward movement of weight on said first end to a second position allowing weight on said first end to move outwardly thereon;
   a plurality of second members individually and independently movably mounted on said bar on said second opposite end, said second members are each selectively movable from a third position blocking outward movement of weight on said second opposite end to a fourth position allowing weight on said second opposite end to move outwardly thereon; and, wherein:
   said first members when all moved to said second position allow weights to be moved on to and off of said first end while said first members remain on said bar; and,
   said second members when all moved to said fourth position allow weights to be moved on to and off of said second opposite end while said second members remain on said bar.

2. A free weight lifting device comprising:
   a lifting bar with a first end and a second end;
   a first collar and a second collar mounted to said bar respectively inwardly of said first end and said second end;
   a plurality of first plates movably mounted on said first end outwardly of said first collar;
   a plurality of first weights mounted on said first end each having a central aperture through which said first plates pass as said first weights are moved on to and off of said first end while said first plates remain on said bar, said first plates are selectively movable to a blocking position securing said first weights between said first collar and the most inward of said first plates in said blocking position;
   a plurality of second plates movably mounted on said second end outwardly of said second collar; and,
   a plurality of second weights mounted on said second end each having a central aperture through which said second plates pass as said second weights are moved on to and off of said second end while said second plates remain on said bar, said second plates are selectively movable to a blocking position securing said second weights between said second collar and the most inward of said second plates in said blocking position.

3. The device of claim 2 and further comprising:
   first adjustment means on said first end and positioned on opposite sides of said first plates being operable to releasably hold said first plates tightly together; and,
   second adjustment means on said second end and positioned on opposite sides of said second plates being operable to releasably hold said second plates tightly together.

4. The device of claim 3 wherein:
   said first adjustment means and said second adjustment means each include a collar threadedly mounted onto respectively said first end and said second end and each further include a spring biased member mounted respectively inwardly of said first end and said second end.

5. The device of claim 4 and further comprising:
   bearing means mounted adjacent and outwardly of said first collar and said second collar and mounted outwardly and adjacent said first plates and said second plates operable to allow said first plates and said second plates with said first weights and said second weights to move about said axis as said bar is rotated.

6. A lifting bar for use with free weights comprising:
   a lifting bar with a first end and a second end;
   a first stop and a second stop on said bar respectively inwardly of said first end and said second end;
   a plurality of first plates movably mounted on said first end outwardly of said first stop, said first plates are selectively movable to a blocking position to secure weights between said first stop and the most inward of said first plates in said blocking position, said first plates pass through weights as weights are moved on to and off of said first end while said first plates remain on said bar; and,
   a plurality of second plates movably mounted on said second end outwardly of said second stop, said second plates are selectively movable to a blocking position to secure weights between said second stop and the most inward of said second plates in said blocking position, said second plates pass through weights as weights are moved on to and off of said second end while said second plates remain on said bar.

7. The lifting bar of claim 6 and further comprising:
   adjustment means mounted on said first end and said second end adjacent said first plates and said second plates operable to releasably hold said first plates tightly together and said second plates tightly together.

8. The lifting bar of claim 6 wherein:
   said first plates and said second plates are disc shaped and are pivotally mounted off center on said bar and are free to move about said bar.

9. The lifting bar of claim 6 wherein:
   said first plates are groupable into a first group axially located within weights positioned on said first end and into a second group located outwardly of weights positioned on said first end blocking outward movement thereof; and,
   said second plates are groupable into a third group axially located within weithts positioned on said second end and into a fourth group located outwardly of weights positioned on said second end blocking outward movement thereof.

10. The lifting bar of claim 6 wherein:
    said first plates and said second plates have equal outside diameters and equal inside diameters.

* * * * *